United States Patent Office 3,337,975
Patented Aug. 29, 1967

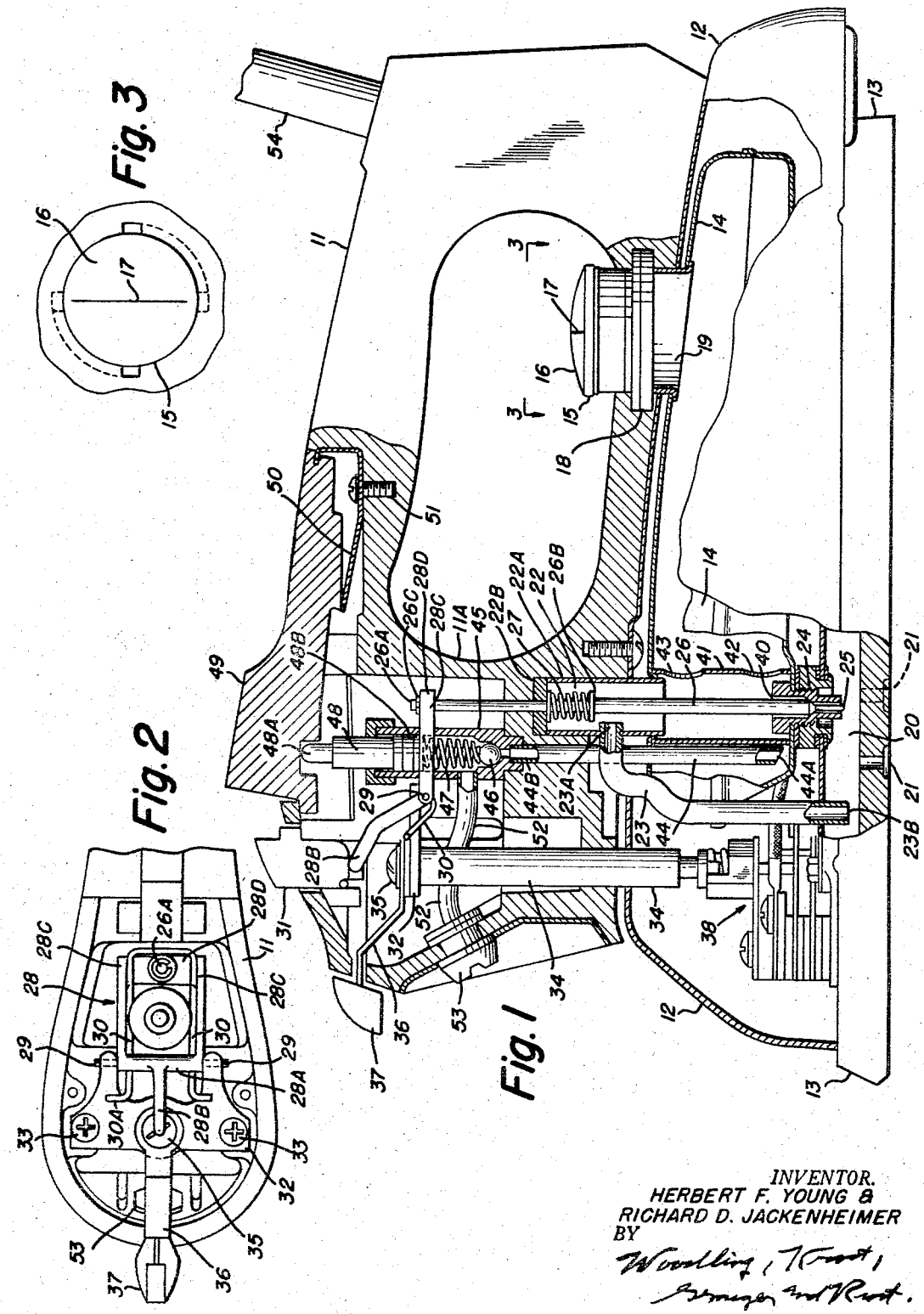

3,337,975
ELECTRIC STEAM IRON
Herbert F. Young, Mansfield, and Richard D. Jackenheimer, Ashland, Ohio, assignors to Dominion Electric Corporation, a corporation of Ohio
Filed Oct. 14, 1965, Ser. No. 495,834
12 Claims. (Cl. 38—77)

ABSTRACT OF THE DISCLOSURE

A steam iron wherein the valve between the water reservoir and steam chamber is urged by resilient means to a closed position and is opened by a positive mechanical action opposing such resilient means, but which mechanical action is not aided by other resilient means, whereby the operation of the valve is not dependent upon a plurality of opposing resilient means in counter-balance, and wherein a cap providing access to the water reservoir is readily mounted and demounted by a bayonet-type coupling, the cap being transparent to expose the water in the reservoir and carrying indicia for comparison with the water level in the reservoir when the iron is tipped up on its heel.

---

Our invention relates to electric irons and particularly of the type utilized as steam irons and/or spray irons.

An object of our invention is to provide an improved structure in an electric iron incorporating novel means for filling a water reservoir in the iron and for permitting ready inspection of the amount of water in the reservoir.

Another object is the provision of a unique combination of means for filling the water reservoir of an iron and at the same time for permitting ready determination of the level of the water in the reservoir.

Another object is the provision in a steam iron for minimizing the possibility of water inadvertently entering the steam chamber of the iron.

Another object is the provision of a unique arrangement for providing relief of steam in the water reservoir from a sufficiently high level to avoid the flow of water from the reservoir through a relief tube.

Another object is the provision of providing a dome in the iron structure to receive steam under pressure from the water reservoir and for relieving steam pressure from the dome causing such steam to enter the steam chamber of the iron.

Another object is the provision of a unique arrangement for operating the valve which controls the flow of water from the water reservoir to a steam chamber in a steam iron.

Another object is the provision of a control means which requires a positive mechanical action to open the valve between the water reservoir and the steam chamber of a steam iron.

Another object is the provision for eliminating the need of counter-balancing springs upon the control rod which actuates the valve between the water reservoir and the steam chamber.

Another object is the provision of a unique arrangement for the water intake for the spray mechanism and of a baffle within the water reservoir between such water intake and the valve inlet controlling the flow of fluid from the water reservoir to the steam chamber.

Another object is the provision of a unique combination of spray mechanism and steam control mechanism in a combination spray-steam iron.

Other objects and a fuller understanding of the invention may be had by referring to the following description and claims, taken in conjunction with the accompanying drawing, in which:

FIGURE 1 is a side view of spray and steam iron incorporating the several features of our invention and showing the iron partially in cross-section FIGURE 2 is a plan view of a portion of our iron with the top wall of the handle structure removed; and FIGURE 3 is a plan view partially in section looking in the direction of the arrows 3—3 of FIGURE 1.

Our iron has a handle structure 11 of the usual heat and electrical insulating material mounted over a shell 12, preferably a metal stamping, which in turn is mounted to a sole plate 13. Mounted within the shell 12 over the sole plate 13 is a water reservoir 14. Intermediate the ends of the water reservoir 14 and located rearwardly of the iron as illustrated, there is a conduit 19 extending upwardly through aligned openings in the reservoir 14, shell 12 and handle structure 11, which conduit is properly sealed with gaskets 18. Removably mounted on the upper open end of the conduit 19 by means of lugs and recesses, as illustrated, is a removable filler cap 15. By turning the cap 15 so as to align the lugs with the recesses, the cap 15 may be readily removed. However, by turning the cap 15 a proper degree, the filler cap is held or locked on to the conduit 19. The filler cap 15 has a transparent top wall 16 which permits visual inspection therethrough into the interior of the conduit 19 and the interior of the reservoir 14. There is an indicia means 17 marked on the said top wall 16 of the cap 15 in the form of a line printed thereon, which line is substantially in a transverse plane through the axis of the cap 15. Upon the iron being tilted upwardly from its normal horizontal position shown in FIGURE 1 so as to rest upon its heel, the water in the reservoir 14 flows into the conduit 19 and the level of the water may be viewed through the glass top wall 16. The level of the water may be compared with the line 17 when the iron is in its upwardly tilted position.

Located in the sole plate 13 below the reservoir 14 is a steam chamber 20 where steam may be generated by reason of the heat provided by the heating elements embedded in the sole plate 13. A plurality of steam outlet ports 21 in the bottom of the sole plate permit steam generated in the chamber 20 to escape outwardly on to the material being ironed.

Extending upwardly into the handle structure 11 is a dome 22 which is the highest location in which steam or vapor formed in the water reservoir 14 may rise. This dome 22 has a metal cylindrical wall 22A and a top wall 22B which prevent the steam or water vapor from directly contacting the insulating material of handle structure 11.

Extending into the dome 22 at a location considerably above the highest point or location in the water reservoir 14 is a relief tube 23 preferably of rubber for purposes of installation. The upper end 23A of the relief tube 23 extends into and communicates with the dome 22. The lower opening 23B of the tube extends down into and communicates with the steam chamber 20. Thus any steam, water vapor or the like rising up into the dome 22 may be relieved therefrom and fed downwardly through the tube 23 into the steam chamber 20 where it may be generated into hot usable steam for use in the usual steaming operation of the iron.

Interconnecting the reservoir 14 and the steam chamber 20 is a valve seat assembly 24. This valve seat assembly 24 has a port 40 therethrough, through which the water may flow from the reservoir 14 to the steam chamber 20 when the port 40 is open. The amount of water which may flow therethrough, of course, depends upon the degree of the opening and closing of the port 40. A movable valve part 25 of the needle type is located in the port 40 and, as seen in the drawing, the degree of opening in the port 40 and hence the amount of water which may flow therethrough, depends upon the elevation of the movable valve part 25.

Integral with and extending axially upward from the valve part 25 is an operating rod 26. Reciprocal movement of the rod 26 relative to the axis of the port 40 provides corresponding movement of the valve part 25. The rod 26 has a portion 26A of smaller diameter than the lower part thereof and extending axially upwardly into the handle structure 11, as illustrated. At the lower end of the lower portion 26A and within the dome 22 there is a lower shoulder portion 26B formed on the rod 26. At the upper end of the lower portion 26A there is an upper shoulder 26C providing a head movable with the rod 26. Interposed between the shoulder 26B and the top wall 22B of the dome, there is a coil spring 27 concentrically mounted on the rod portion 26. The bias of this spring 27 is such as to resiliently urge the rod 26 downwardly and hence to urge the valve part 25 downwardly to a position to close the port 40 in the valve seat assembly 24.

Pivotally mounted on a pivot 29 carried by the handle structure 11, is a yoke lever 28. As seen in the drawing, the lever 28 has a cross-portion 28A which carries the pivot 29 in such a manner as to permit the lever 28 to swing in a plane longitudinally of the iron. The pivot 29 is carried on a cross-bar 32 which, by means of screws 33, is carried by the handle structure 11. Extending forwardly from the cross-portion 28A is a forward finger portion 28B and extending rearwardly from the cross-portion 28A are two parallel spaced portions 28C. Joining the rearward ends of the portions 28C are guide portions 28D which slidably embrace the upper end of the rod portion 26 under the upper shoulder or head 26C.

The forward finger portion 28B extends angularly upwardly and forwardly from the cross-portion 28A to a location immediately below an actuating button 31 which is reciprocal in an opening of complementary shape in the front wall of the handle structure 11. Upon actuating button 31 being pressed downwardly, this presses downwardly on the upper end of the forward finger portion 28B and causes the lever 28 to pivotally swing on the pivot 29 and causes the guide portion 28D to rise upwardly. The guide portion 28D engages under the shoulder or head 26C of the rod 26 and correspondingly causes the rod 26 to be moved upwardly. The fit of the guide portion 28D around the rod portion 26A is a loose sliding fit so that downward movement of the guide portion 28D of lever 28 in itself does not cause the rod 26 to move downwardly but merely permits the rod 26 to move downwardly under the resilient urging of the coil spring 27.

To aid in holding the button 31 upwardly in a ready operating position, a U-shaped spring 30, having bent ends 30A, is so positioned as to resiliently urge the guide portion 28D downwardly and this, in turn, urges the forward finger portion 28B upwardly into engagement with the button 31. The sides of the U-shaped spring 30 fit under the cross-portion 28A and over the guide portion 28D with the bent ends 30A anchored on the cross-bar 32.

A thermostat and switch assembly indicated generally by the reference character 38 is mounted within the shell 12 over the sole plate 13 as illustrated. A control stem 34 connected to the thermostat and switch assembly 38 extends upwardly through aligned openings in the shell 12 and handle structure 11 as shown. A lever 36 is secured to the upper end of the stem 34 by a screw 35 so that swinging of the lever 36 in a horizontal slot in the forward end of the handle structure 11 causes the stem 34 to rotate on its axis. A button 37 of suitable insulating material is mounted on the forward outer end of the lever 36 for ready manipulation by the operator.

Secured to and extending through the reservoir 14 is a cylindrical metal baffle 41 which is disposed concentrically of the port 40 of valve assembly 24 and also concentric with the cylindrical shell 22A around the dome 22. This cylindrical baffle 41 extends completely around the rod 26 and registers with the lower end of the cylindrical shell 22A. Extending through the cylindrical baffle 41 on the side directed rearwardly of the iron are two round openings, the lower opening 42 and the upper opening 43.

It is to be noted that the interior of the baffle 41 is separated from the rest of the interior of the reservoir 14 other than through the rearwardly directed openings 42 and 43.

Extending downwardly into the reservoir 14 directly in advance of the forwardmost wall of the baffle 41 is a metal intake tube 44, the lower open end 44A of the tube 44 being raised somewhat from the bottom of the reservoir 14 as illustrated. Carried by the handle structure 11 and secured to the upper open end 44B of the tube 44 is a cylinder member 45. Positioned within the cylinder member 45 in axial alignment with the tube 44 and so as to control the flow of water between the cylinder member 45 and the tube 44 is a ball check valve 46. Downward movement of the ball check valve 46 prevents water from flowing downwardly from the cylinder member 45 into the tube 44 but upon upward movement of the ball check valve 46, water may flow upwardly from the reservoir 14 through the tube 44 into the cylinder member 45. A coil spring 47 in the cylinder member 45 is so anchored and biased as to resiliently urge the ball check valve 46 downwardly. Extending in and axially of the cylinder member 45 is a piston member 48. This piston member 48 has an upper portion 48A which protrudes outwardly from the cylinder member 45 for actuation thereof and has a piston head 48B in close sliding fit with the interior of wall of the cylinder member 45 so as to provide the usual piston and cylinder action upon reciprocal action of the piston member 48.

Positioned over the upper extension 48A is an actuating bar 49 spring-biased into the forward portion shown in FIGURE 1 by a leaf spring 50. Downward pressure on the upper forward end of the bar 49 by the operator presses the piston member 48 downwardly and presses upon the water in the cylinder member 45 to cause it to be expelled therefrom. A screw 51 secures the spring 50 to the handle structure 11 and the arrangement is such that the lever 49 may be swung by the pivot support provided by spring 50 against the resiliency of the spring 50.

Connected to and communicating with the cylinder member 45 is a rubber spray tube 52 which is connected to and communicates with a nozzle assembly 53. Water within the cylinder member 45 and under pressure by the piston 48 is expelled out through the tube 52 and is thus sprayed forwardly of the iron through the nozzle assembly 53 for the spraying of material being ironed. Return upward movement of the piston 48 sucks water up through the tube 44 from the reservoir 14, past the ball check valve 46 and again fills the cylinder member 45.

The electric cord 54 shown broken away in FIGURE 1 supplies electric current to the iron in the usual manner. The combination of structural features and arrangement of the parts here shown and described provides an iron with unique and improved operating characteristics.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. In a steam iron having a water reservoir in a shell under the base portion of a handle structure, comprising the combination of a conduit member extending through said shell and base portion and communicating with the water reservoir near the top thereof with the iron in its normal horizontal position, an upright plane through the said conduit member being located intermediate the ends of said water reservoir when in said normal horizontal position and substantially spaced from the rearward end of the reservoir, a readily mountable and demountable cap on the upper end of said conduit for closing the same and for opening the same to permit water to be poured through the conduit into the reservoir, said cap protruding upwardly above said base portion, said cap and base portion having complementary lugs and recesses to lock the cap over said conduit upon the cap being turned to position the lugs and recesses out of registration and to unlock the cap upon the cap being turned to position the lugs and recesses in registration, said cap having a transparent wall for permitting visual sighting therethrough into said conduit, said transparent wall providing a sight window to the interior of the reservoir for determining the level of water therein upon the tilting of the iron upright from said normal horizontal position.

2. The combination claimed in claim 1 and including indicia means carried by said cap for ready comparison of the level of the water with said indicia means upon said tilting of the iron.

3. In a steam iron having a water reservoir and a handle having a base portion extended above said reservoir, the combination of a conduit member extending through said handle base portion upwardly from and communicating with said reservoir, said conduit member having an open upper end for providing access thereto for the filling of the reservoir through said conduit member, said conduit member terminating within said handle base portion and communicating with an opening in said handle base portion axially aligned with said conduit member, a cap member detachably mounted on said upper end for the closing and opening of the same, said cap member having lugs extending radially thereof and said handle base portion having recesses about said opening therein for receiving said lugs in a bayonet coupling relationship, said cap member having a transparent wall for visual sighting therethrough, and indicia means carried by said cap member adjacent said transparent wall for ready comparison of the position of said indicia means with the level of the water in said reservoir upon the upward tilting of said iron from its normal horizontal position to permit water therein to flow into said conduit member.

4. In a steam iron having a water reservoir, a steam chamber therebelow for production of steam from water admitted thereto from the water reservoir through an interconnection between the same, the combination of a valve assembly for controlling the flow of water from the reservoir through the interconnection to the steam chamber, said valve assembly including a fixed valve seat and a valve body movable axially of the valve seat, an actuating rod carrying the valve body for reciprocably moving the same along said axis, a first abutment carried by said iron at a fixed location spaced axially from said valve seat, a second abutment carried by said actuating rod at an axial distance from said valve seat and from said first abutment, said second abutment being movable with said actuating rod, a coil spring interposed between said first and second abutments and bearing on the same, said coil spring being biased to urge said actuating rod in a downward direction to move the valve body to closed position, an operating lever pivotably carried intermediate its ends by said iron, a first end portion of said operating lever being arranged to engage and raise said actuating rod upon upward movement of said first end portion and to release said actuating rod to permit it to move downwardly under the urging of said coil spring, a reciprocally movable button carried by the iron for movement by the operator of the iron and located adjacent a second end portion of said operating lever to engage and move said second end portion downwardly upon depression of said button by the operator of the iron, the arrangement providing for upward movement of the actuating rod by the said button lowering the second end portion and the pivotal swinging of the operating lever to raise correspondingly the first end portion and the raising of the actuating rod thereby against the bias of the said spring to open said valve assembly.

5. The combination as claimed in claim 4 and including a resilient biasing member resiliently urging said operating lever in a direction to depress said first end portion and to raise said second end portion and the button engaged therewith.

6. In a steam and spray iron having a water reservoir, a steam chamber, a valve port between said reservoir and chamber for providing communication therebetween, a movable valve body for controlling communication through said port, an actuating rod carrying, and extending axially of, said valve body for actuating the same, and a pump for drawing water from said reservoir and discharging the same through a nozzle carried by the iron, the combination of a cylindrical baffle mounted in said reservoir concentrically of said port and said actuating rod, a dome extending upwardly of said reservoir and registering with said baffle member, said baffle member being in communication with the interior of the reservoir to receive water therefrom, an intake conduit extending downwardly into said reservoir and having an inlet forwardly of said baffle member, the wall of said baffle member being disposed intermediate of said port and said inlet and extending upwardly in said reservoir for limiting surge of water therein, said dome being disposed to collect water vapor rising from water in said reservoir, a relief tube interconnecting said dome and steam chamber for venting vapor from said dome into said chamber, an operating lever carried by said iron operable by the user of the iron, said actuating rod extending through the upper wall of said dome and having an engaging portion engageable by said lever to cause the actuating rod to be raised mechanically and positively raised by said lever upon swinging of the actuating lever in one direction only and to free the actuating rod from restraint by the lever upon swinging of the lever in an opposite direction, said rod and valve being free of other upwardly directed force, and a coil spring about said actuating rod engaging said actuating rod and said upper wall of the dome, the coil spring being biased to urge the actuating rod downwardly to a position moving the valve body into closed position in said port, the downward resilient force of said coil spring on said actuating rod being unopposed by other resilient force.

7. The combination claimed in claim 6 and including biasing means for biasing said operating lever toward said opposite direction.

8. In a steam and spray iron having a water reservoir, a steam chamber, a pump for drawing water from the reservoir and ejecting it through a nozzle, a valve for controlling flow of water from the reservoir to the chamber, the combination of a dome disposed over the reservoir to receive water vapor formed from water in the reservoir, a valve actuating rod axially aligned with and extending from the valve upwardly through the reservoir, through the dome and above the same for the actuation thereof, said rod and valve being free of upwardly directed resilient force, a supply conduit extending from said pump to said reservoir and having an inlet in the reservoir forwardly of said valve and rod, a baffle in said reservoir intermediate said inlet and said valve and concentric with said dome and said actuating rod, said baffle being open to said reservoir on the rearward side of said valve and actuating rod, and resilient means in said dome in engagement with said actuating rod and biased to urge it downwardly to close said valve, and operating means carried by the iron and operable by the user of the iron for positively raising without aid of upwardly directed resilient force said actuating rod against the force of said resilient means.

9. The combination claimed in claim 8 and including biasing means associated with said operating means for biasing the same into a position not raising said actuating rod, said resilient means being unopposed by said biasing means.

10. The combination claimed in claim 9 and including a transparent removable cap mounted on an opening into said reservoir upon the top of the reservoir for the addition of water into the reservoir and for providing a sight glass to determine the level of the water in the reservoir upon the upright tilting of the iron from its normal horizontal position.

11. In a steam iron having a valve controlling the flow of water from the water reservoir to the steam chamber and a valve actuating rod axially aligned with said valve and extending upwardly through the reservoir and through a dome protruding upwardly from the reservoir, the combination of resilient means carried by the iron and engaging the rod and biased to resiliently urge the rod downwardly to a position to close said valve, said resilient means being unopposed by a counter-resilient force urging said rod upwardly, a mechanical linkage operable from without the iron and engageable with said rod to positively raise the rod upon operation of the linkage in one direction and to free the rod upon movement of the linkage in an opposite direction, said rod and linkage being free of other force urging said rod upwardly to open said valve.

12. The combination claimed in claim 11 and including biasing means biasing the linkage means in said opposite direction without opposing said resilient means.

References Cited
UNITED STATES PATENTS

| | | | |
|---|---|---|---|
| 2,769,257 | 11/1956 | Duncanson et al. | 38—77 |
| 3,041,757 | 8/1962 | Swenson et al. | 38—77 |
| 3,075,309 | 1/1963 | Seyfried et al. | 38—77 |
| 3,103,079 | 9/1963 | Bricker et al. | 38—77 |
| 3,111,780 | 11/1963 | Smith | 38—77 |
| 3,292,283 | 12/1966 | Hanner | 38—77 |

PATRICK D. LAWSON, *Primary Examiner.*